(12) United States Patent
Simonis

(10) Patent No.: US 6,347,497 B1
(45) Date of Patent: Feb. 19, 2002

(54) PROCESS FOR CONSTRUCTING AN ASSEMBLY INSTALLATION HAVING A TRANSPORTING SYSTEM AND ASSEMBLY STATIONS, AND A MACHINE FRAMEWORK

(75) Inventor: Gerhard Simonis, Bremen (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 09/149,835

(22) Filed: Sep. 8, 1998

(Under 37 CFR 1.47)

(30) Foreign Application Priority Data

Sep. 6, 1997 (DE) .......................................... 197 39 148
Nov. 21, 1997 (DE) .......................................... 197 51 641

(51) Int. Cl.⁷ ................................................ E04B 1/00
(52) U.S. Cl. ..................... 52/745.21; 52/653.1; 52/648; 211/186
(58) Field of Search ................................ 52/656.1, 633, 52/648.1, 749.1, 745.17, 745.19, 745.2

(56) References Cited

U.S. PATENT DOCUMENTS 3,977,147 A * 8/1976 Fletcher et al. ................ 52/648
4,124,123 A * 11/1978 Armington et al. .......... 211/186
6,223,494 B1 * 5/2001 Bright ........................ 52/653.1

* cited by examiner

*Primary Examiner*—Carl D. Friedman
*Assistant Examiner*—Steve Varner
(74) *Attorney, Agent, or Firm*—Herbert L. Lerner; Laurence A. Greenberg; Werner H. Stemer

(57) ABSTRACT

Although hitherto known machine frameworks of O-form are sufficiently stable, they can only be installed subsequently in an assembly station if a conveying belt is disengaged, a belt section is removed, a framework is assembled with the removed belt section, and the two are reintroduced together into the assembly station. Although the machine framework of C-form construction can subsequently be pushed onto the transporting system formed of the conveying belts, it is necessary, for stability reasons, for them to be made of considerably thicker material than the O-frameworks. The intention is therefore to specify a process, for constructing an assembly installation, for which a machine framework of O-form is sufficient and which nevertheless contains the subsequent-fitting advantages exhibited by the C-form. For this purpose, transverse struts of the machine framework are removed. They are fastened on the underside of a conveying-belt section. A subframework of the machine framework is positioned on the transverse struts from above and screwed thereto. Finally, the transverse struts are anchored to the ground.

8 Claims, 7 Drawing Sheets

PROCESS FOR CONSTRUCTING AN ASSEMBLY INSTALLATION HAVING A TRANSPORTING SYSTEM AND ASSEMBLY STATIONS, AND A MACHINE FRAMEWORK

BACKGROUND OF THE INVENTION

Field of the Invention

The invention relates to a process for constructing an assembly installation essentially having a transporting system and a plurality of assembly stations. It being the case that, as seen in a transport direction of the transporting system, the conveying-belt sections of the transporting system are enclosed by machine frameworks of the assembly stations. The conveying-belt sections rest on supporting elements, and the transverse struts of a respective machine framework are also utilized for supporting the transporting system.

A transporting system, as seen in its longitudinal direction, is enclosed in a frame-like manner by a machine framework and is described in German Patent DE 195 28 282 C2. The vertically extending columns of the machine framework project, in the direction of the ground, beyond the bottom transverse struts of the machine framework and are fastened on the ground by way of their free ends. The machine frameworks (of O-form) which surround the transporting system have good strength and stabilizing properties, with the result that they can also be utilized for supporting the conveying-belt sections of the transporting system. The disadvantages with these closed machine frameworks of O-form are that they can only be constructed together with the conveying belt. They are therefore very closely linked in mechanical terms with the transporting system. An assembly station can only be installed subsequently if the conveying belt is disengaged, a conveying-belt section is removed, the machine framework is assembled with the conveying-belt section, and the two are reintroduced together into the assembly line of the transporting system.

Published, Non-Prosecuted German Patent Application DE 43 35 134 A1 and DE 43 41 055 A1 and German Patent DE 41 17 509 C1 teach transporting systems disposed on supporting elements. The two first-mentioned documents have their supporting elements fastened on transverse struts.

Machine frameworks which are open on one side, the so-called C-form, are also known. Although the machine frameworks can subsequently be pushed onto the transporting system, and are not connected to the transporting system to such a great extent, it is necessary, for stability reasons, for them to be made of considerably thicker material than the O-frameworks.

SUMMARY OF THE INVENTION

It is accordingly an object of the invention to provide a process for constructing an assembly installation having a transporting system and assembly stations, and a machine framework which overcome the above-mentioned disadvantages of the prior art methods and devices of this general type, for which a machine framework of O-form is structurally sufficient and which nevertheless contains the subsequent-fitting advantages of the C-form.

With the foregoing and other objects in view there is provided, in accordance with the invention, a construction process, which includes: providing an assembly installation including an assembly station having a machine framework with a sub-framework connected to transverse struts; providing a transporting system with conveying-belt sections; placing and supporting the transporting system with the conveying-belt sections on supporting elements; disconnecting the transverse struts from the sub-framework; fastening the disconnected transverse struts to an underside of the conveying-belt sections; enclosing the conveying-belt sections in a transport direction with the machine framework by positioning the sub-framework on the transverse struts from above, and screwing the sub-framework to the transverse struts, the transverse struts further supporting the transporting system; and anchoring the transverse struts secured to the transporting system to a floor.

The object is achieved according to the invention by a combination of the following steps:

a. the transporting system is disposed on the supporting elements;

b. the transverse struts of the respective machine framework which are directed toward the ground are removed;

c. the removed transverse struts are fastened on the underside of a conveying-belt section of the transporting system;

d. a sub-framework of the machine framework is positioned on the transverse strut from above and screwed thereto; and e. the transverse struts are anchored to the ground.

The construction steps permit the subsequent installation of assembly stations with the machine framework of O-form without disengagement of the transporting system being necessary. A further advantage is that the assembly line can generally be constructed in two steps. First of all, the transporting system is fitted and then the assembly stations are added.

Furthermore, the low-level configuration of the transverse struts makes it possible to achieve a low overall height for the transporting system.

According to one preferred configuration of the process, the machine framework is completely preassembled with a plurality of components, e.g. switchgear cabinet and control devices, and is then connected to the transporting system in the manner envisaged.

With the interposition of carrying elements, the subassemblies are set up in functional terms once the assembly station has been constructed for the first time. The respective assembly station remains in the assembled state and is removed in its entirety, transported to the intended use location, and re-erected there in its entirety.

With the foregoing and other objects in view there is also provided, in accordance with the invention, in combination with a transporting system having conveying-belt sections, a machine framework for enclosing the conveying-belt sections in a transport direction, the machine framework including: transverse struts to be anchored to and disposed just above a floor, the transverse struts are fastened to the conveying-belt sections for supporting the transporting system, and the transverse struts having recesses formed therein; and a sub-framework having vertically extending columns with ends, and longitudinal struts interconnecting the ends of the columns, the longitudinal struts having centering pins for engaging in the recesses of the transverse struts and flange-shaped protrusions for receiving screws to connect the sub-framework to the transverse struts. The machine framework for carrying out the process is distinguished in that, at their ends which are directed toward the transverse struts, in each case two of the vertically extending columns of the machine framework are connected to one another by the longitudinal struts which have a flange-like protrusion, which is intended for receiving the screwed connection, and a centering pin, which engages in a recess of the transverse strut.

In another machine framework for carrying out the process, the flange-like protrusion and the centering pin are assigned directly to the free end of the column, with the result that there is no need for the interposition of a longitudinal strut.

With the foregoing and other objects in view there is further provided, in accordance with the invention, in combination with a transporting system having conveying-belt sections, a machine framework for enclosing the conveying belt sections in a transport direction, the machine framework including: transverse struts to be anchored to and disposed toward a floor, the transverse struts fastened to the conveying-belt sections for supporting the transporting system; a sub-framework positioned from above and screwed to the transverse struts; a plurality of subassemblies; carrying elements each receiving one of the plurality of subassemblies, the carrying elements having frames open on a side directed toward the sub-framework, and the frames have free legs connected to the sub-framework. This results in a rigid connection between the carrying element and the sub-framework.

In accordance with an added feature of the invention, there is at least one supporting foot directed toward the floor and connected to the carrying elements. In this configuration, a supporting foot, which is directed away from the free leg end, serves to stabilize the carrying element.

The completely preassembled assembly station is provided with sling eyes in order to permit transportation by a hoist.

Other features which are considered as characteristic for the invention are set forth in the appended claims.

Although the invention is illustrated and described herein as embodied in a process for constructing an assembly installation having a transporting system and assembly stations, and a machine framework, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
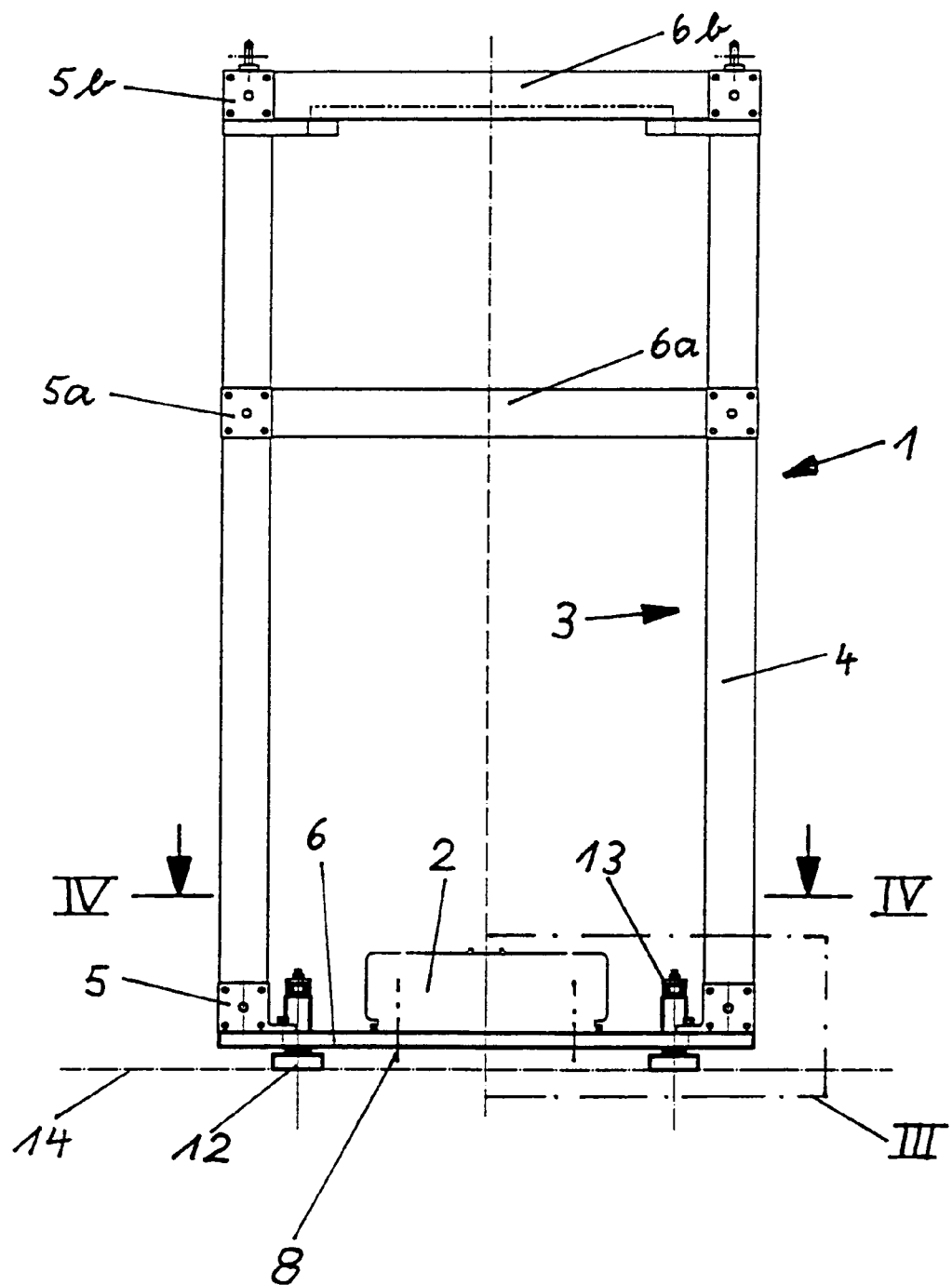
FIG. 1 is a cross-sectional view through an assembly installation with a transporting system and a machine framework.

Referring now to the figures of the drawing in detail and first, particularly, to FIG. 1 thereof, there is shown a cross-sectional view through an assembly installation 1 and a transporting system 2 which has a plurality of non-illustrated conveying-belt sections. A machine framework 3 encloses the transporting system 2 and, in addition to other non-illustrated supporting elements, serves for supporting the conveying-belt sections. As can be seen in conjunction with FIGS. 2 to 4, the machine framework 3 includes four columns 4, which are held together by longitudinal struts 5, 5a, 5b and transverse struts 6, 6a, 6b to form a rigid machine framework 3. The machine framework 3 serves for receiving various non-illustrated components, e.g. testing, assembling and processing/machining configurations and/or switchgear cabinets. The parallel transverse struts 6, which are separated from the machine framework 3 after removing connection screws 7, is introduced beneath the conveying-belt sections of the transporting system 2, the conveying-belt sections already resting on non-illustrated supporting elements, and the transverse struts 6 are connected to longitudinal profiles 16 of the transporting system 2 by a screwed connection 8, with the interposition of a lug 15. Onto the transverse struts 6, which are now secured with respect to the transporting system 2, a sub-framework 3a (FIG. 2) is fitted over the transporting system 2, by vertical movement in the downward direction, with the aid of a non-illustrated hoist and is connected to the transverse struts 6 by the screws 7, via a flange-like protrusion 9 (FIG. 3) of the longitudinal strut 5. For reliable positioning, the longitudinal struts 5 are provided with centering pins 10 that engage in recesse 11 the transverse struts 6.

Figure 2:
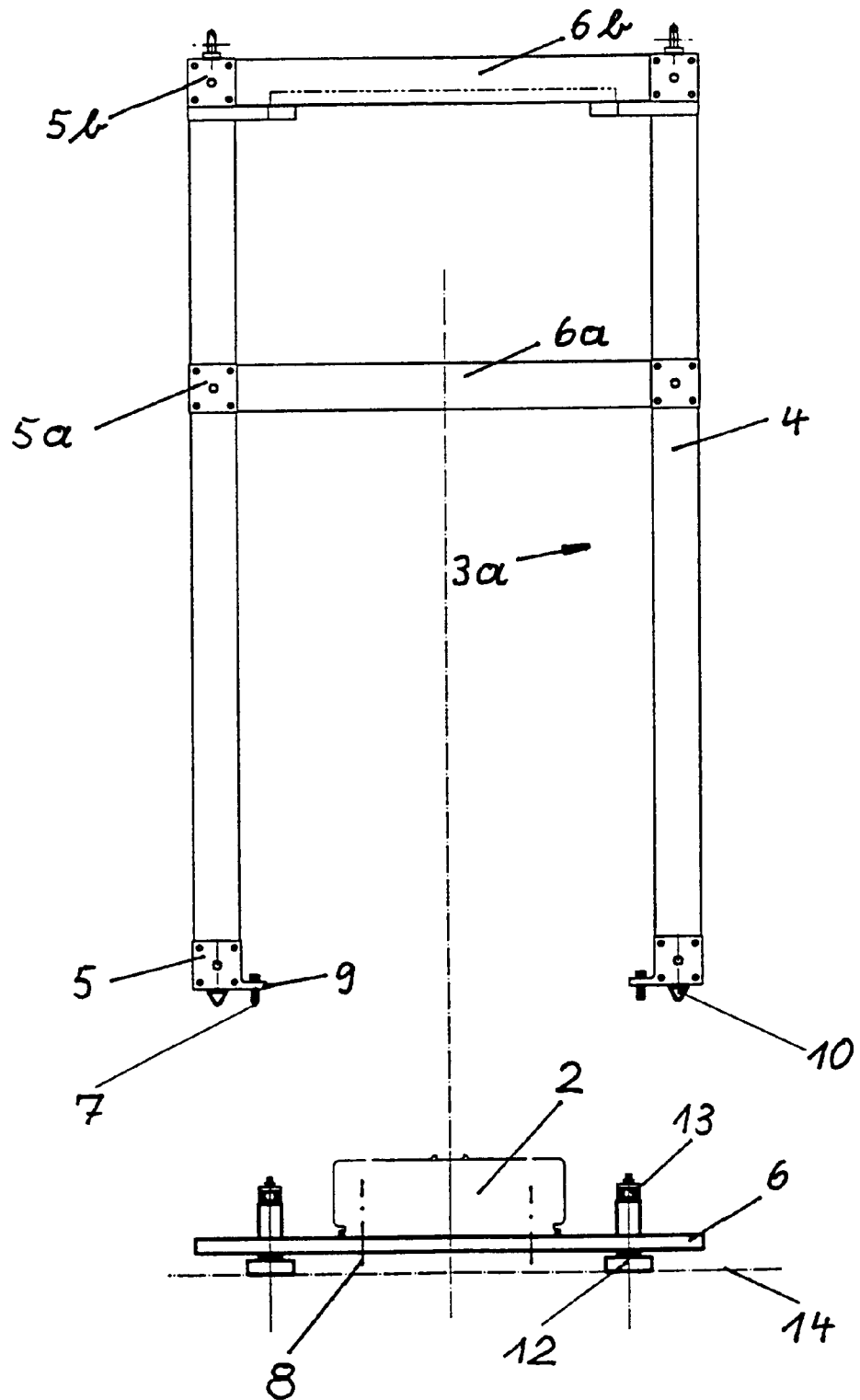
FIG. 2 is an exploded, cross-sectional view of a transverse strut with the transporting system as well as a sub-framework during its vertical movement.
Figure 3:
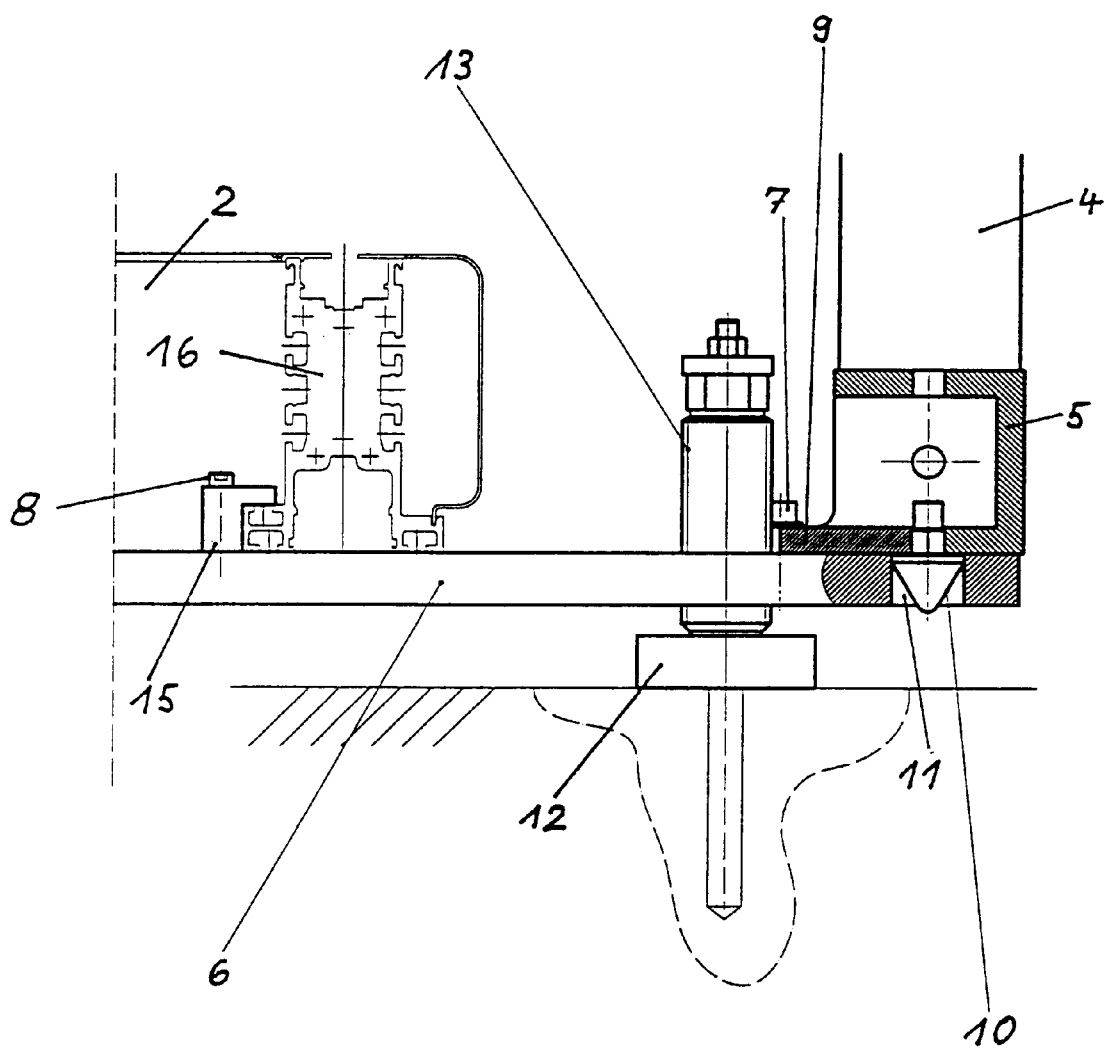
FIG. 3 is an enlarged, fragmentary, cross-sectional view of the transporting system.
Figure 4:
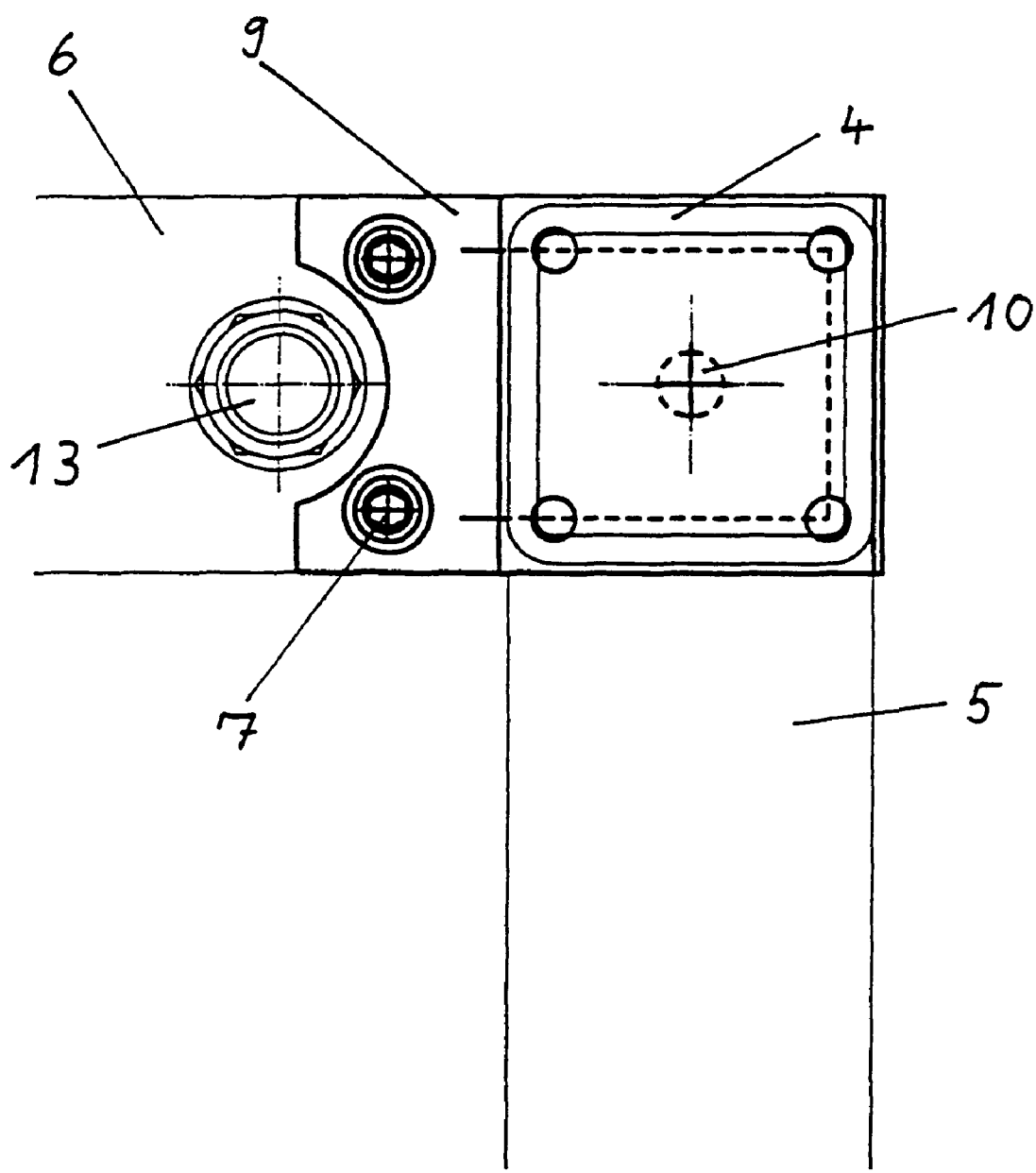
FIG. 4 is an enlarged, sectional view taken along the line IV—IV of FIG. 1.

As can be seen from FIGS. 2 and 3, the transverse struts 6 are anchored to a floor (ground) 14 by a peg 13, with the interposition of a bearing 12. In this manner, the machine framework 3 is retained in position and the transverse struts 6 serve as an additional support for the transporting system 2.

Figure 5:
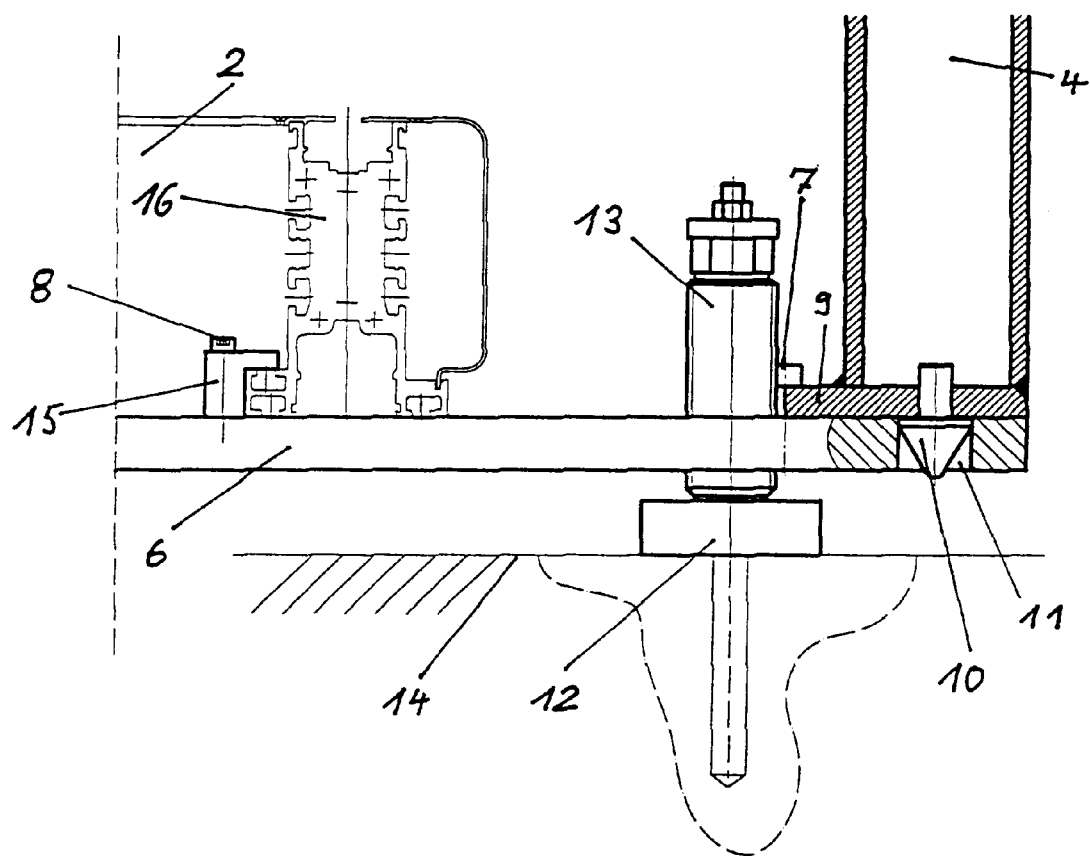
FIG. 5 is an enlarged, fragmentary, cross-sectional view taken of a second embodiment of the transporting system.

As an alternative to the configuration according to FIG. 3, FIG. 5 illustrates that the column 4 is moved right up to the transverse strut 6 by way of its free end. Here too, the flange-like protrusion 9 serves for receiving the screws 7. The centering pin 10 is assigned directly to the end of the column 4 and engages in the recess 11 of the transverse strut 6.

Figure 6:
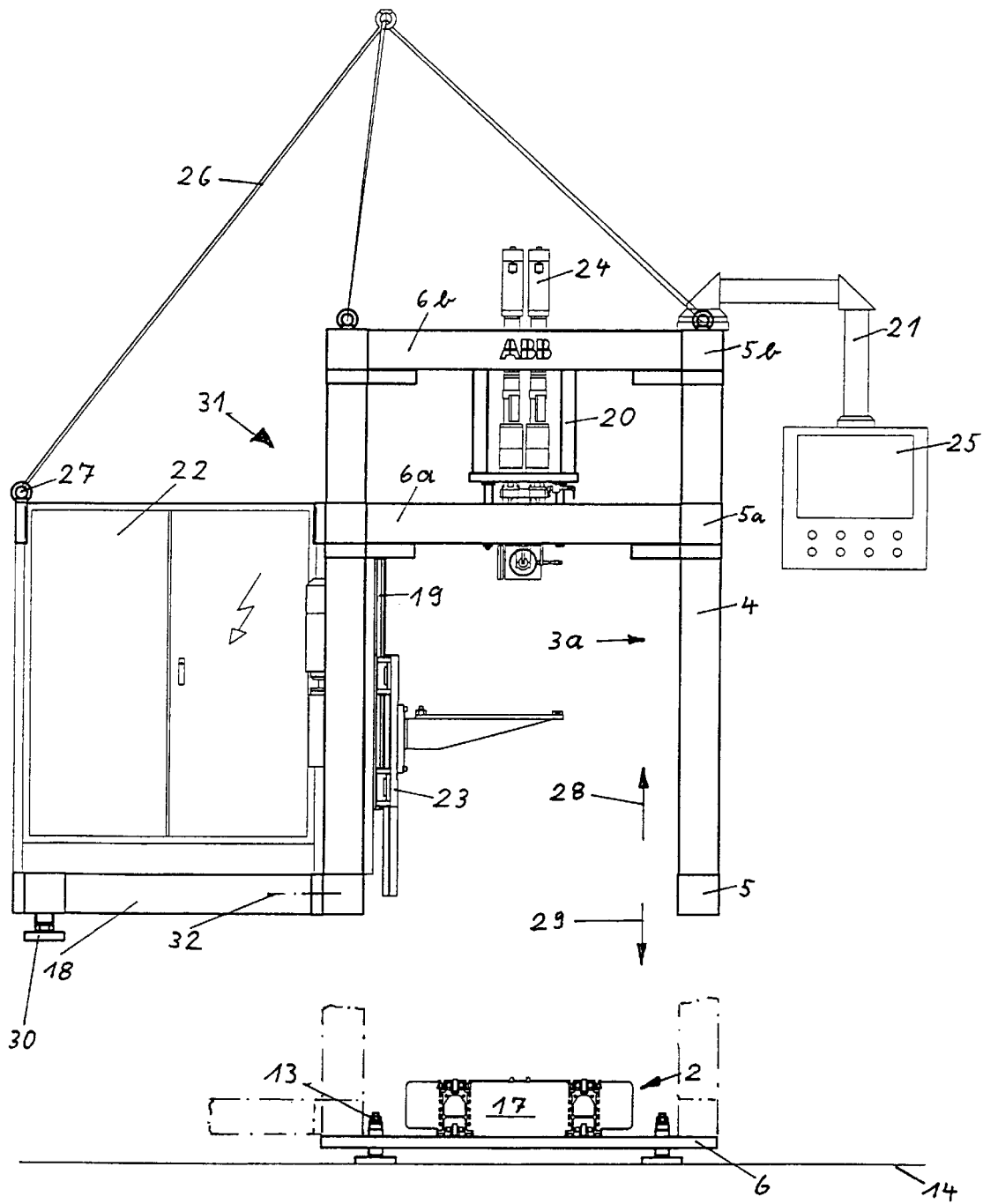
FIG. 6 is a cross-sectional view through the assembly installation with the transporting system and an assembly station during vertical movement, the latter not having any lower transverse struts.

FIG. 6 shows a cross-sectional view through the assembly installation 1 with the transporting system 2 having a plurality of conveying-belt sections 17 disposed in a row. The transverse strut 6, which is separated from the machine framework 3, is fastened on the underside of the transporting system 2, on a conveying-belt section 17 resting on non-illustrated supports. The remaining sub-framework 3a is, in accordance with FIG. 2, fitted over the transporting system 2 and fastened on the transverse struts 6 by the screws 7. As can be seen in conjunction with FIG. 4, the machine framework 3 includes two parallel transverse struts 6 and the sub-framework 3a, which is formed from columns 4, longitudinal struts 5, 5a, 5b and transverse struts 6a, 6b.

Once the sub-framework 3a and the transverse struts 6 have assumed the connected position, which is shown in FIG. 3 and is indicated by chain-dotted lines in FIG. 1.

Carrying elements 18–21 are rigidly connected to the sub-framework 3a by screwed connections, which are indicated by 32. The respective carrying element has a switchgear cabinet 22, a long-stroke unit 23, a screwing-in/unscrewing unit 24 and an operating console 25 positioned and fastened on it. An assembly station 31, which is equipped with subassemblies in this manner, is connected electrically and pneumatically and is tested in functional terms in a trial run. Following the completion of the trial run, the screws 7 are removed from the transverse struts 6. With the aid of the non-illustrated hoist, of which the sling acts on eyes 27 by ropes 26, the sub-framework 3a, together with the carrying elements 18, 19, 20, 21 and the subassemblies 22, 23, 24, 25, is moved vertically upward in the direction of arrow 28 and then moved in its entirety, on a suitable transporting device, to the intended use location. Once the individual conveying-belt sections 17, with the transverse struts 6 released from the floor 14 again, have been brought to the use location, they make up part of the transporting system 2 there again and the transverse struts 6 are pegged to the ground 14 at the final use location. By use of the hoist, the sub-framework 3a, which is fitted with the carrying elements 18–21 and subassemblies 22–25, is lowered in a vertical direction 29 until it comes into contact with the transverse struts 6, and is screw-connected by the screws 7. The assembly installation 1 can then perform the intended tasks without any time-consuming set-up work having to be carried out. If necessary, a supporting foot 30 (FIG. 6) may be brought to bear against the floor 14 for the purpose of stabilizing the installation.

Figure 7:
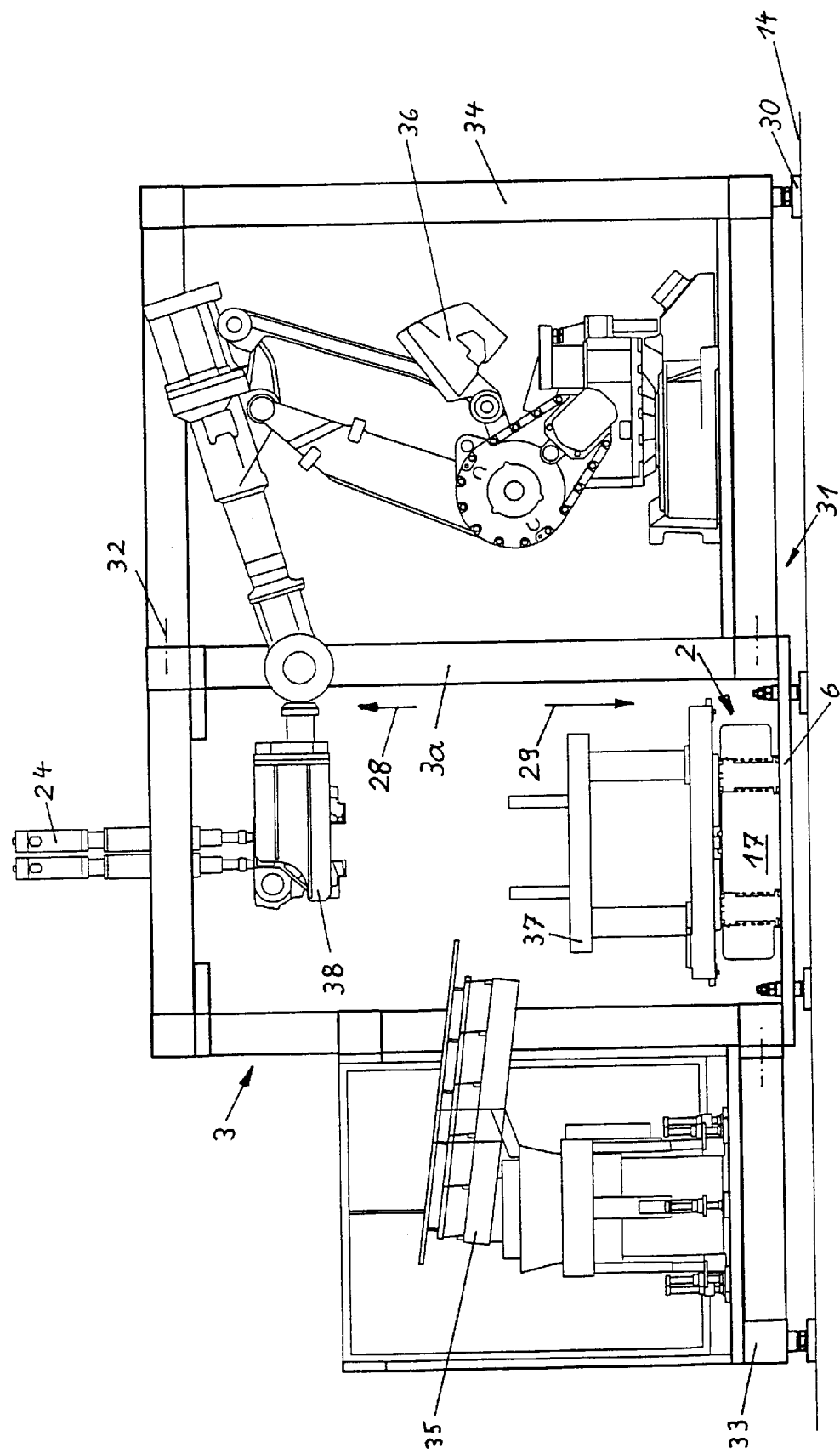
FIG. 7 is a cross-sectional view through the assembly station with the sub-framework positioned on the transverse struts.

An exemplary embodiment according to FIG. 7 shows an assembly station 31 during its trial run at the production location or during operation at the intended use location. The assembly installation 1 has now, in part, been equipped with other subassemblies. Corresponding carrying elements 33, 34 are connected rigidly to the sub-framework 3a via the screw connections 32. They bear a supply unit 35 and a robot 36. Here too, once the screws 7 have been removed, it is possible for the sub-framework 3a, together with the carrying elements 33, 34 and the subassemblies 35, 36 disposed thereon, to be raised in the vertical direction 28 and, at the intended use location, to be fitted over the transporting system 2 in the vertical direction 29. FIG. 7 shows a work-piece carrier 37 which rests on the transporting system 2 and from which a work-piece 38 has been raised by the robot 36 and moved into position relative to a screwing-in/unscrewing unit 24 which is fastened directly on the sub-framework 3a. Here too, supporting feet 30 help to stabilize the installation with respect to the ground 14.

I claim:

1. A construction process, which comprises:
   providing an assembly installation including an assembly station having a machine framework with a sub-framework and transverse struts connected to said sub-framework;
   providing a transporting system with conveying-belt sections;
   placing and supporting the transporting system with the conveying-belt sections on supporting elements;
   disconnecting the transverse struts from the sub-framework;
   fastening the disconnected transverse struts to an underside of the conveying-belt sections;
   enclosing the conveying-belt sections in a transport direction with the machine framework by positioning the sub-framework on the transverse struts from above, and screwing the sub-framework to the transverse struts, the transverse struts further supporting the transporting system; and
   anchoring the transverse struts secured to the transporting system to a floor.

2. The process according to claim 1, which comprises pre-assembling the machine framework with a plurality of components before the machine framework encloses the conveying-belt sections of the transporting system.

3. The process according to claim 1, which comprises connecting carrying elements to the sub-framework, each of the carrying elements receiving a subassembly of the assembly station, and during subsequent removing, transporting and re-erecting steps, the carrying elements remaining connected to the sub-framework.

4. In combination with a transporting system having conveying-belt sections, a machine framework for enclosing the conveying-belt sections in a transport direction, the machine framework comprising:
   transverse struts to be anchored to and disposed just above a floor, said transverse struts fastened to the conveying-belt sections for supporting the transporting system, and said transverse struts having recesses formed therein; and
   a sub-framework having vertically extending columns with ends, and longitudinal struts interconnecting said ends of said columns, said longitudinal struts having centering pins for engaging in said recesses of said transverse struts and flange-shaped protrusions for receiving screws to connect said sub-framework to said transverse struts.

5. In combination with a transporting system having conveying-belt sections, a machine framework for enclosing the conveying-belt sections in a transport direction, the machine framework comprising:
   transverse struts to be anchored to and directed toward a floor, said transverse struts fastened to the conveying-belt sections for supporting the transporting system, and said transverse struts having recesses formed therein; and
   a sub-framework having vertically extending columns with ends directed toward said transverse struts, said ends of said vertically extending columns having centering pins for engaging in said recesses of said transverse struts and flange-shaped protrusions for receiving screws for connecting said sub-framework to said transverse struts.

6. In combination with a transporting system having conveying-belt sections, a machine framework for enclosing the conveying belt sections in a transport direction, the machine framework comprising:
   transverse struts to be anchored to and disposed toward a floor, said transverse struts fastened to the conveying-belt sections for supporting the transporting system;
   a sub-framework positioned from above and screwed to said transverse struts;
   a plurality of subassemblies; and
   carrying elements each receiving one of said plurality of subassemblies, said carrying elements configured as frames open on a side directed toward said sub-framework, and said frames having free legs connected to said sub-framework.

7. The machine framework according to claim 6, including at least one supporting foot directed toward the floor and connected to said carrying elements.

8. The machine framework according to claim 5, wherein at least one of said sub-framework and said carrying elements are provided with sling eyes for a hoist.

* * * * *